United States Patent
Loving et al.

(10) Patent No.: US 6,805,012 B2
(45) Date of Patent: Oct. 19, 2004

(54) LINEAR ACTUATOR

(75) Inventors: Roger Scott Loving, Boulder, CO (US); Anthony William Pankratz, Arvada, CO (US)

(73) Assignee: Micro Motion, Inc., Boulder, CO (US)

( * ) Notice: Subject to any disclaimer, the term of this patent is extended or adjusted under 35 U.S.C. 154(b) by 189 days.

(21) Appl. No.: 10/205,967

(22) Filed: Jul. 26, 2002

(65) Prior Publication Data

US 2004/0016303 A1 Jan. 29, 2004

(51) Int. Cl.[7] ................................................. G01F 1/78
(52) U.S. Cl. ................................................. 73/861.354
(58) Field of Search ..................... 73/861.354, 861.355, 73/861.356; 248/605, 177.1, 292.12

(56) References Cited

U.S. PATENT DOCUMENTS

| | | | | |
|---|---|---|---|---|
| 4,199,123 A | * | 4/1980 | Weber et al. ............... | 248/168 |
| 4,988,064 A | * | 1/1991 | Hoshino ...................... | 248/170 |
| 5,003,328 A | * | 3/1991 | Gaynor ........................ | 396/428 |
| 5,048,350 A | | 9/1991 | Hussain et al. | |
| 5,218,873 A | | 6/1993 | Lang | |
| 5,987,998 A | | 11/1999 | Campbell et al. | |
| 6,189,845 B1 | * | 2/2001 | Chen ........................ | 248/177.1 |
| 6,579,017 B2 | * | 6/2003 | Wei ............................. | 396/428 |

* cited by examiner

Primary Examiner—Edward Lefkowitz
Assistant Examiner—Jewel V. Thompson
(74) Attorney, Agent, or Firm—Duft Setter Ollila & Bornsen LLC

(57) ABSTRACT

The present invention relates to a linear actuator that maximizes the flux density in the air gap where work is to be done by increasing the lines of flux that are captured while keeping the cost of production and mass relatively low. This is achieved by an improved linear actuator, which is characterized by a keeper comprised of a cross-shaped piece of ferromagnetic material bent such that the four ends of the cross are located perpendicular to the longitudinal axis of the magnet.

34 Claims, 6 Drawing Sheets

LINEAR ACTUATOR

FIELD OF INVENTION

The present invention relates generally to mass flow rate and density measuring apparatus, and more particularly to an improved flow rate sensor having improved sensitivity.

PROBLEM

It is known to use Coriolis effect mass flowmeters to measure mass flow and other information pertaining to materials flowing through a pipeline as disclosed in U.S. Pat. No. 4,491,025 issued to J. E. Smith, et al. of Jan. 1, 1985 and U.S. Pat. No. Re. 31,450 to J. E. Smith of Feb. 11, 1982. Flowmeters have one or more conduits of a straight, curved or irregular configuration. Each conduit has a set of natural vibration modes which may be of a simple bending, torsional, or twisting type. Each material filled conduit is driven to oscillate at resonance in one of these natural modes. The natural vibration modes are defined in part by the combined mass of the flow conduits and the material within the flow conduits. If desired, a flowmeter need not be driven at a natural mode.

Material flows into the flowmeter from a connected material source on the inlet side. The material passes through the conduit or conduits and exits the outlet side of the flowmeter.

A drive mechanism applies force to oscillate the conduit. When there is no material flow, all points along a conduit oscillate with an identical phase in the first bending mode of the conduit. With material flow, Coriolis accelerations cause each point on the conduit to have a different phase with respect to other points on the conduit: the phase on the inlet side of the conduit lags the driver; the phase on the outlet side leads the driver. Pickoffs are placed on the conduit to produce sinusoidal signals representative of the motion of the conduit. The phase difference between two sensor signals is divided by the frequency of oscillation to obtain a delay which is proportional to the mass flow rate of the material flow.

The drive mechanism of the Coriolis flowmeter is affixed to the conduit(s) and oscillates the conduit(s) in response to a signal from driver control circuitry. A conventional drive mechanism for a Coriolis flow meter has a magnetic circuit comprising a keeper, magnet and pole piece mounted in opposition to a coil. The driver control circuitry applies an electric current or drive signal to the coil of the drive mechanism. The current flowing through the coil generates electromagnetic forces between the drive coil and the magnet thereby causing the conduits to vibrate.

The design and implementation of a drive mechanism is important because the greater the amount of power a drive mechanism can produce, the better the performance of the flow meter in high damping applications.

Past drive mechanism designs have focused on reducing cost and mass while doing very little to increase the power output. This design focus, coupled with the industry's desire to lower the cost and size of Coriolis flow meters, magnifies the difficulty in drive system design.

A typical drive design is developed based on the following two equations:

$$P_{disapated} = -2*\omega*\xi*K*A^2 \qquad (1)$$

where:
  $\omega$=angular velocity of the system
  $\xi$=critical damping ratio of system
  K=system stiffness
  A=system amplitude
  P=system power
and $$P_{delivered} = 2*\omega*I*B*L*A \qquad (2)$$

where:
  $\omega$=angular velocity of the system
  I=available current
  B=total flux
  L=length of wire on coil
  A=system amplitude
  P=system power Equation (1) represents the power dissipated by the Coriolis flow meter and Equation (2) represents the power delivered to the flow meter by the drive mechanism. In some cases, depending on the application and location that the flow meter will be placed in, the amount of power delivered to the flow meter is limited by area approval agencies (i.e. UL, CENELEC, TIIS).

In normal operation, frequency and conduit amplitude are pre-defined resulting in equations (1) and (2) being equal. However, many factors can cause a flow meter to deviate from normal operation. Such factors include entrained air, high viscosity fluids, and material flow comprising large amounts of solids. The deviation from normal operation results in damping of the vibrational characteristics of the system, thus requiring an increase in the power supplied to the flow meter to return the meter to normal operation. In order to ensure continued operation of the sensor during occasions when a flow meter deviates from normal operation, designers design in "overhead" or "reserve power". "Overhead" is defined as the maximum power available to the sensor divided by the power needed to drive the system during normal operation.

In order to generate the overhead needed by a sensor, a drive mechanism designer must strive to increase the power available to the sensor. However, of the variables comprising equations (1) and (2), variables K, $\omega$ and $\xi$ are determined by the geometry of the sensor and I is limited by the area approval agencies, leaving only B, L and A available to the designer.

From equations (1) and (2), it is clear that increasing conduit amplitude, A, would result in power being dissipated faster than power being supplied. Increasing the length of wire on a coil would increase power, however, an increase in the length of wire would increase the resistance and thereby reduce the delivered power. Additionally, there are additional safety restraints imposed by the approval agencies on the relationship between a coil's inductance and resistance. However, the flux, B, can be increased without impacting the power dissipated nor affecting those variables constrained by an approval agency.

The total flux, B, represents how closely packed (i.e. the "density") the flux lines are that compose the magnetic field. In order to efficiently utilize the magnetic field, a "keeper" is placed around the magnet. The keeper is a piece of ferromagnetic material, such as carbon steel, that acts as a conductor for the lines of flux. The flux lines are concentrated in the steel keeper, as a ferromagnetic material will support a greater concentration than will air. In addition to serving as a conductor for the flux lines, the keeper also channels the lines of flux so as to create the maximum flux density in an air gap where work will be done. In the case of a magnet/coil driver, the coil is positioned in the air gap and orientated to maximize the cross product between the flux and current vectors.

One prior art design uses a strip of metal bent into an open channel (FIG. 1). The channel design is relatively inexpensive to build but surrounds only a small portion of the magnet, failing to "capture" a large number of flux lines. Another prior art design utilizes a cup-shaped keeper (FIGS. 2A & 2B). This cup-shaped keeper design maximizes the flux lines that are captured, due to its 360 degree conductive area, however, the design is costly to produce and extremely weight prohibitive.

SOLUTION

The object of the invention is a linear actuator that maximizes the flux density in the air gap where work is to be done by increasing the lines of flux that are captured while keeping the cost of production and mass relatively low. The object is achieved by an improved linear actuator, which is characterized by a keeper comprised of a cross-shaped piece of ferromagnetic material bent such that the four ends of the cross are located perpendicular to the longitudinal axis of the magnet.

The keeper increases the total flux available to the drive mechanism without negatively impacting other variables in the system. In addition, the keeper is light weight and easy to manufacture.

One possible preferred exemplary embodiment of the linear actuator according to the invention is characterized by the keeper being composed of a ferromagnetic material, preferably steel. The keeper is manufactured by forming a piece of material into a cross-shape with end portions of the legs contoured to closely match the exterior contour of the magnet. The legs are bent to form two 90 degree angles resulting in the end portions being perpendicular to the longitudinal axis of the magnet.

Another possible preferred embodiment of the linear actuator according to the invention is characterized by a mounting bracket composed of a ferromagnetic material. In some cases the flux density generated by the magnet exceeds the keeper's capacity to carry, resulting in flux saturation of the keeper. When the keeper becomes saturated, any additional flux generated by the magnet goes through the air. In order to capture the additional flux, a ferromagnetic mounting bracket is located at a pole of the magnet.

The invention allows a majority of the lines of flux to be captured by the linear actuator and channeled through the coil at a preferential angle. The invention also significantly reduces the gap between the magnet while nearly surrounding the magnet.

DETAILED DESCRIPTION OF THE INVENTION

Figure 1:
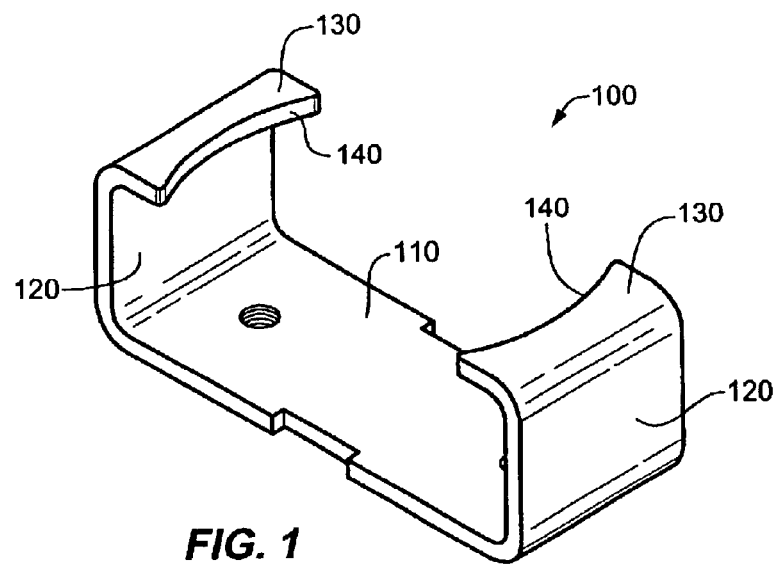
FIG. 1 is a magnet keeper according to the prior art.

Description of FIG. 1

FIG. 1 is a previously known magnet keeper 100 incorporated into linear actuator design. The magnet keeper 100 includes a substantially flat portion 110 configured to mate to a mounting structure (not shown), two side portions 120, and two top portions 130. The two top portions have an arcuate surface 140 shaped to closely accommodate the exterior portion of a magnet (not shown). The magnet sits on the interior surface of flat portion 110 with a resulting gap between the magnet exterior and the arcuate surface 140 of the top portions 130. The gap allows for the passing of a coil (not shown) between the keeper and the magnet. Keeper 100 is formed by bending sheet metal to the described shape.

Figure 2A:
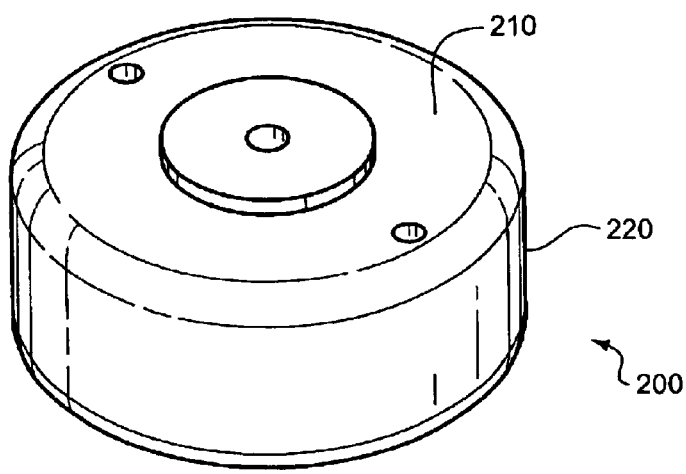
FIG. 2A is an additional magnet keeper according to the prior art.
Figure 2B:
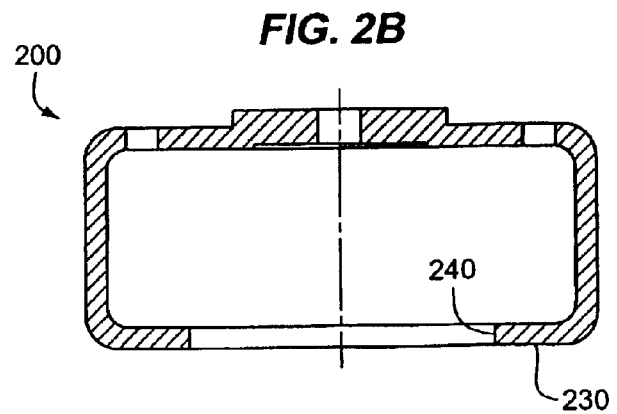
FIG. 2B is a section view of the keeper in FIG. 2A.

Description of FIGS. 2A & 2B

FIGS. 2A & 2B disclose another priorly known keeper 200 adapted to be incorporated into a linear actuator design. Keeper 200 is referred in the art as a cup keeper. The cup-shaped design comprises a bottom circular flat portion 210, a circular side wall 220 and a circular top portion 230 forming a lip on top of the side wall 220. The top portion 230 has an interior surface 240 which is shaped to closely conform to the exterior shape of a magnet (not shown). The magnet sits on the interior surface of flat portion 210 with a resulting gap between the magnet exterior and the surface 240 of the top portions 230. The gap allows for the passing of a coil (not shown) between the keeper and the magnet. Keeper 200 is formed by casting, bending, or machining.

Figure 3:
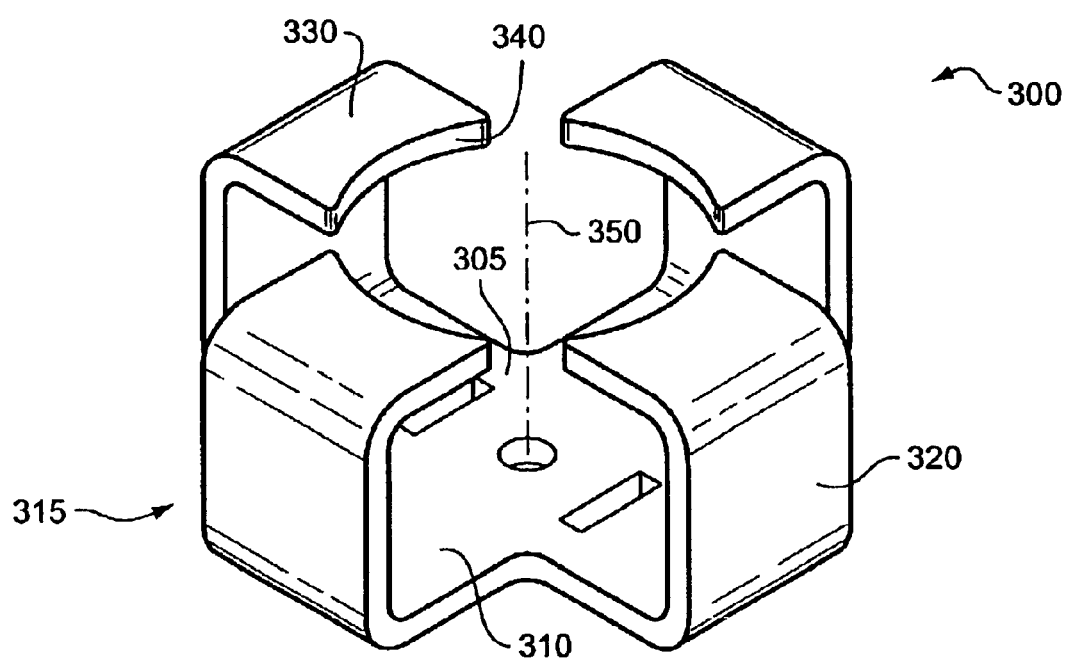
FIG. 3 discloses a magnet keeper in accordance with the present invention.

Description of FIG. 3

FIG. 3 describes a keeper 300 according to a preferred embodiment of the invention. Keeper 300 is comprised of a substantially flat base portion 305 with a longitudinal axis 350 and four legs 315 extending from flat base portion 305. Each leg 315 is comprised of a lower portion 310 extending from the flat base portion 305, a side portion 320 extending at a right angle from the lower portion 310 and a top portion 330 extending at a right angle from the side portion 320. The top portion 330 has an arcuate interior surface 340 shaped to closely conform to the exterior shape of a magnet (not shown). The magnet sits on the interior surface of flat lower portion 305 with a resulting gap between the magnet exterior and the arcuate surfaces 340. The gap allows for the passing of a coil (not shown) between the keeper 300 and the magnet. Keeper 300 is formed by bending sheet metal to the described shape.

Figure 4:
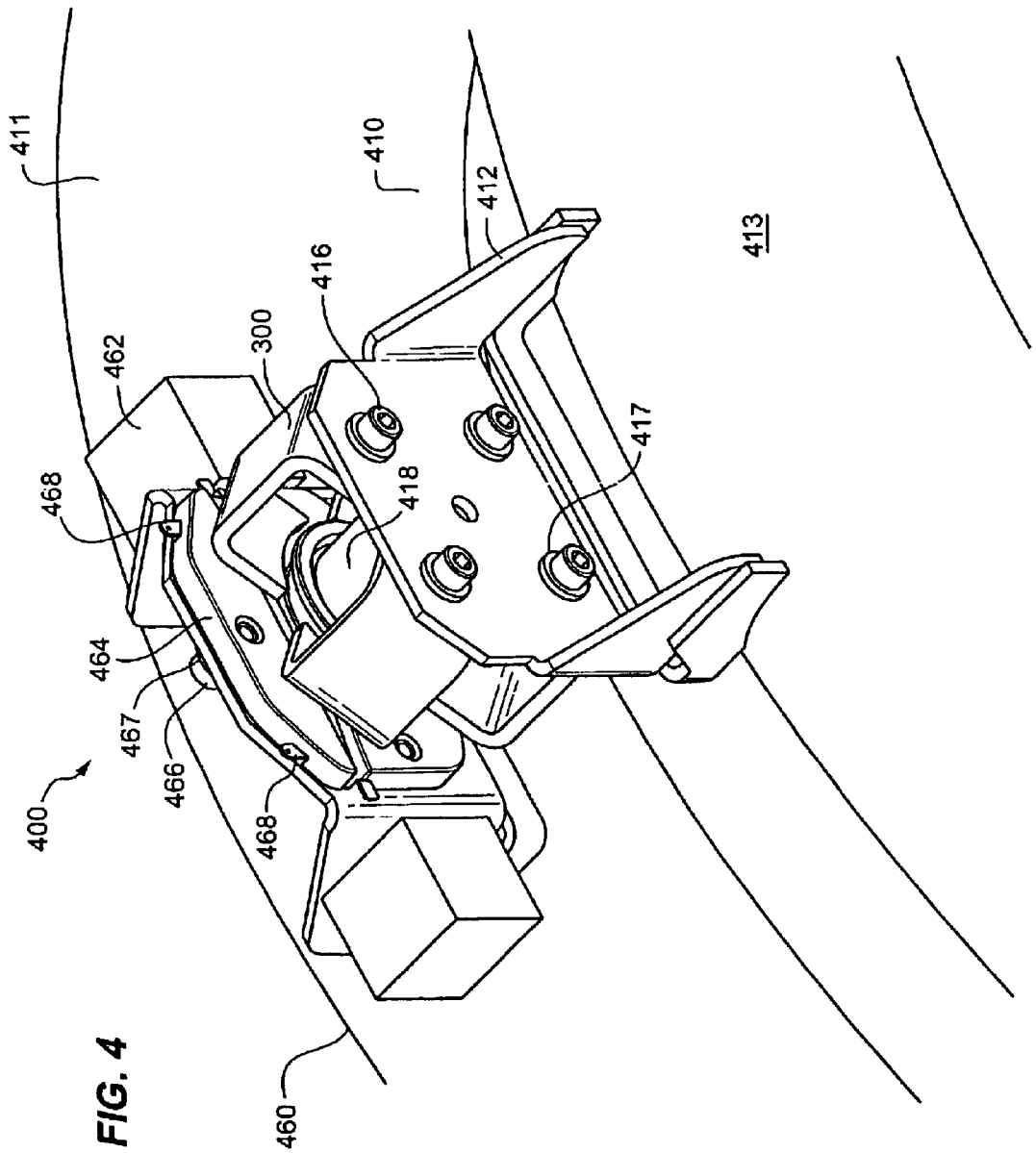
FIG. 4 is an assembly view disclosing a linear actuator design in accordance with the present invention.

Description of FIG. 4

FIG. 4 depicts a linear actuator design 400 affixed to conduits 411 and 413 of a Coriolis flow meter. The linear actuator design is comprised of two sections, a magnet section 410 and a coil section 460.

Magnet portion 410 comprises a magnet mounting bracket 412 for mounting magnet 418 and keeper 300 to conduit 413. Keeper 300 is attached to mounting bracket 412 by screws 416 and washers 417. Magnet assembly 418 is held in place on keeper 412 using a combination of an adhesive, locating features and the magnetic attraction between the magnet assembly 418 and keeper 412.

Coil portion 460 comprises a coil mounting bracket 462 for mounting coil 464 to conduit 411. The coil 464 is attached to the coil mounting bracket 462 by screws 466 and washers 467. When mounted, coil 464 is positioned in the gap between the interior surface 340 (shown in FIG. 3) of the keeper 300 and the exterior of the magnet assembly 418.

In operation, power is applied to the coil 464 via electronics (not shown) through terminals 468. Once power is applied, the coil's polarity is reversed at intervals which cause either attraction or repulsion of the magnet, resulting in an oscillation motion of the conduits 411 and 413.

Figure 5:
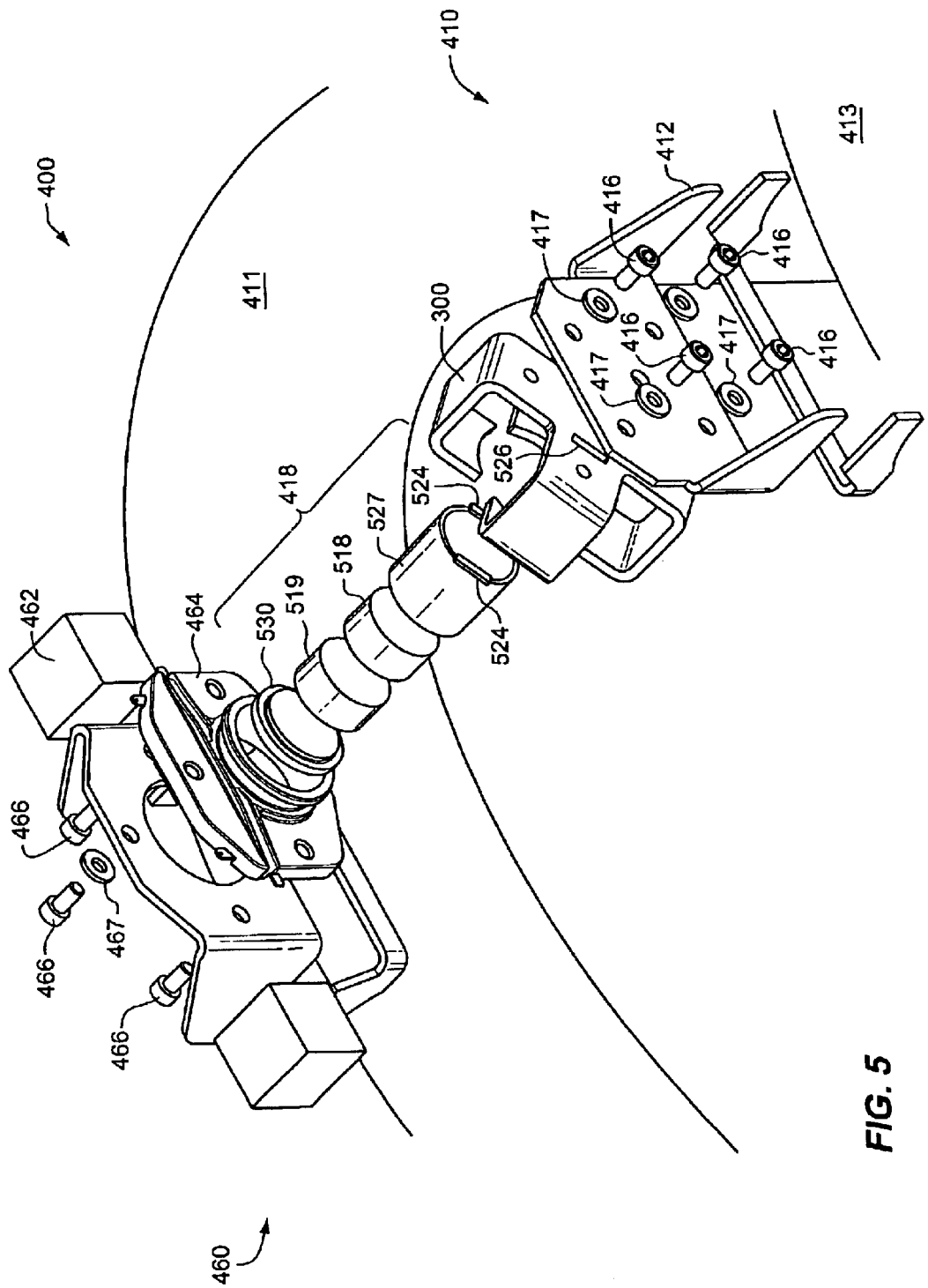
FIG. 5 is an exploded view of FIG. 4.

Description of FIG. 5

FIG. 5 is an exploded view showing further detail the liner actuator of FIG. 4. As discussed above, a linear actuator 400 is composed of two sections, a magnet section 410 and a coil section 460.

The magnet section 410 comprises mounting bracket 412 attached to conduit 413, keeper 300 coupled to mounting bracket 412 by screws 416 and washers 417, and magnet assembly 418. Magnet assembly 418 is further comprised of a lower magnet portion 518, an upper magnet portion 519 and a pole piece 530 encompassed in a magnet sleeve 527. Magnet sleeve 527 has two protrusions 524 extending from its bottom portion that fit into corresponding slots 526 on the keeper. Protrusions 524 and slots 526 ensure the proper alignment of the magnet assembly 418 in the magnet section 410.

The coil section 460 comprises a coil mounting bracket 462 attached to conduit 411 and a coil 464 attached to the coil mounting bracket 462 by screws 466 and washers 467. The assembled coil 464 resides in a gap between keeper 300 and magnet assembly 418.

Figure 6:
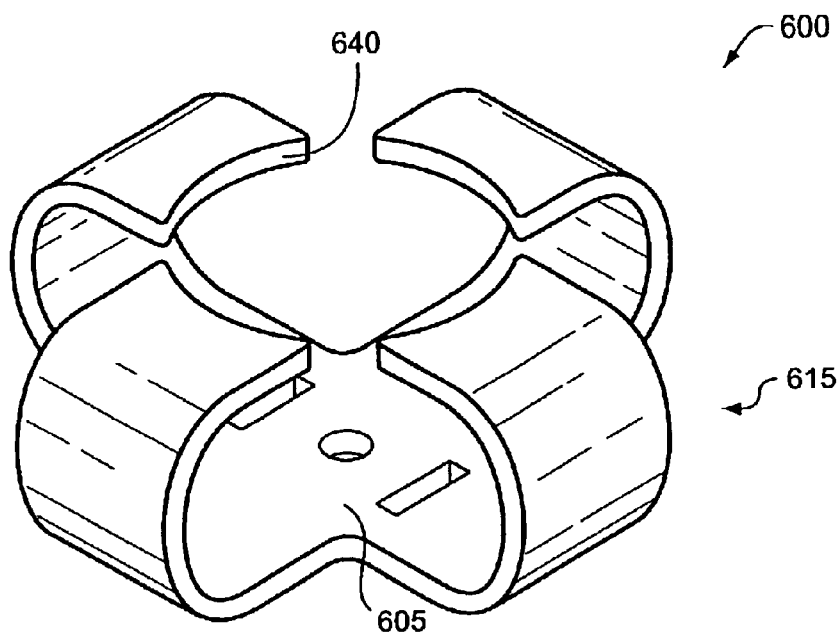
FIG. 6 discloses an alternative magnet keeper in accordance with the present invention.

Description of FIG. 6

FIG. 6 describes an alternative keeper 600. Keeper 600 is comprised of a flat base portion 605 and curved side legs 615. Each leg 615 is terminated by an arcuate interior surface 640 shaped to closely conform to the exterior shape of a magnet (not shown).

Figure 7:
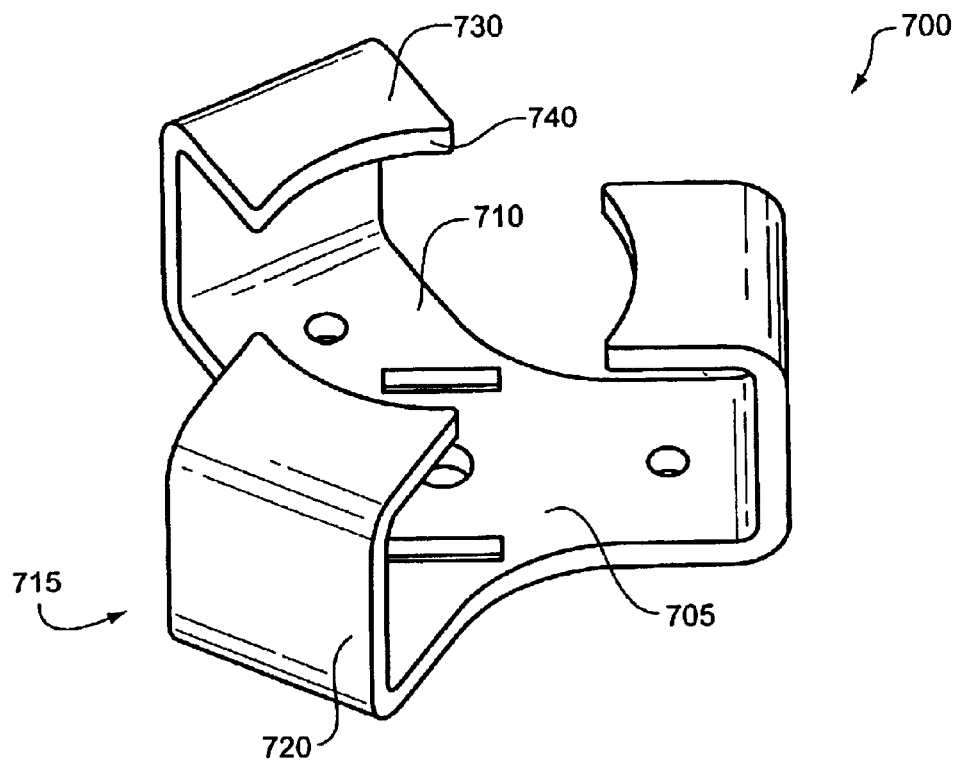
FIG. 7 discloses another alternative magnet keeper in accordance with the present invention.

Description of FIG. 7

FIG. 7 describes an another alternative keeper 700. Keeper 700 is comprised of a flat base portion 705 and three curved side legs 715. Each leg 715 is comprised of a lower portion 710 extending from the flat base portion 705, a side portion 720 extending at a right angle from the lower portion 710 and a top portion 730 extending at a right angle from the side portion 720. The top portion 730 has an arcuate interior surface 740 shaped to closely conform to the exterior shape of a magnet assembly (not shown). The magnet sits on the interior surface of flat lower portion 705 with a resulting gap between the magnet exterior and the arcuate surfaces 740. The gap allows for the passing of a coil (not shown) between the keeper 700 and the magnet.

Figure 8:
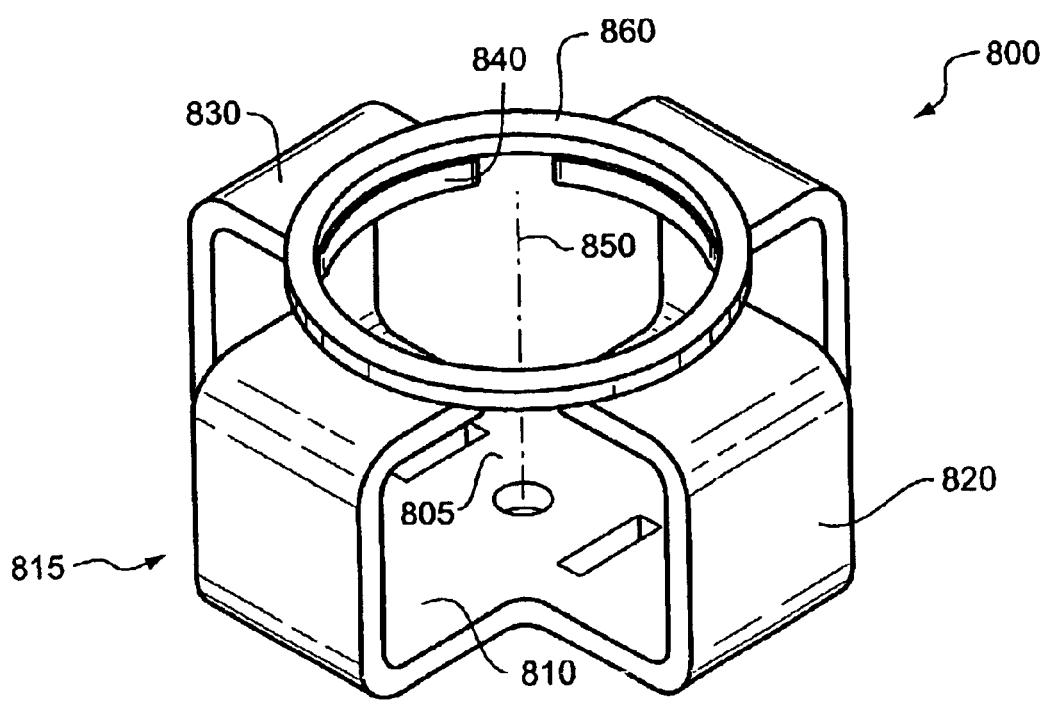
FIG. 8 discloses another additional alternative magnet keeper in accordance with the present invention.

Description of FIG. 8

FIG. 8 describes an another additional alternative keeper 800. Keeper 800 is comprised of a substantially flat base portion 805 with a longitudinal axis 850 and four legs 815 extending from flat base portion 805. Each leg 815 is comprised of a lower portion 810 extending from the flat base portion 805, a side portion 820 extending at a right angle from the lower portion 810 and a top portion 830 extending at a right angle from the side portion 820. The top portion 830 has an arcuate interior surface 840 shaped to closely conform to the exterior shape of a magnet (not shown). A disc member 860 is affixed to top portions 830 of legs 815. The addition of disc member 860 allows for complete encirclement of the circumference of the magnetic while keeping the cost of manufacture low. The magnet sits on the interior surface of flat lower portion 805 with a resulting gap between the magnet exterior and arcuate surfaces 840 and disc member 860. The gap allows for the passing of a coil (not shown) between the keeper 800 and the magnet (not shown).

In summary, it can be seen from the foregoing that the provision of a linear actuator with an improved keeper design can significantly improve the performance of a drive system by increasing both the efficiency and manufacturability. It is to be expressly understood that the claimed invention is not to be limited to the description of the preferred embodiment but encompasses other modifications and alterations.

What is claimed is:

1. An apparatus for substantially enclosing a magnet, the apparatus comprising:
   a keeper having a base; and
   at least three legs extending from the base, each leg having
      a bottom member attached to and extending radially away from the base,
      a side member attached to and extending upwardly from the bottom member, where at least a portion of the side member is parallel to the longitudinal axis of the base, and
      a top member attached to and extending inwardly from the side member towards the longitudinal axis of the base, where at least a portion of the top member is perpendicular to the longitudinal axis of the base.

2. The keeper of claim 1, wherein the bottom, side and top members of each leg define a continuous curved strip.

3. The keeper of claim 1, wherein:
   the bottom members are substantially perpendicular to the longitudinal axis of the base;
   the side members are substantially parallel to the longitudinal axis of the base; and
   the top members are substantially perpendicular to the longitudinal axis of the base.

4. The keeper of claim 1, wherein the top members each have an arcuate terminus.

5. The keeper of claim 1, wherein the combined terminus of each top member encircles at least fifty but less than one hundred percent of the magnet perimeter.

6. The keeper of claim 1, wherein the material of construction is ferromagnetic.

7. The keeper of claim 1 having four legs extending from the base.

8. The keeper of claim 1 further comprising a disc member attached to one or more of the top members.

9. A method of manufacturing the keeper of claim 1, comprising the steps of:
   forming a piece of material to conform to a shape having a base and at least three legs extending from the base; and
   bending the piece of material such that each leg comprises:
      a bottom member extending radially away from the base,
      a side member extending upwardly from the bottom member,
      where at least a portion of the side member is parallel to the longitudinal axis of the base, and
      a top member extending inwardly from the side member
      towards the longitudinal axis of the base, where at least a portion of the top member is perpendicular to the longitudinal axis of the base.

10. The method of claim 9 wherein the step of forming comprises laser cutting.

11. The keeper of claim 1 in combination with a linear actuator, wherein the linear actuator comprises:

a magnet assembly having a magnet; and a coil assembly having a coil which slidably interacts with the magnet assembly.

12. The keeper of claim 11, wherein the bottom, side and top members of each leg define a continuous curved strip.

13. The keeper of claim 11, wherein:

the bottom members are substantially perpendicular to the longitudinal axis of the base;

the side members are substantially parallel to the longitudinal axis of the base; and the top members are substantially perpendicular to the longitudinal axis of the base.

14. The keeper of claim 11, wherein the top members each have an arcuate terminus.

15. The keeper of claim 11, wherein the combined terminus of each top member encircles at least fifty but less than one hundred percent of the magnet perimeter.

16. The keeper of claim 11, wherein the material of construction of the keeper is ferromagnetic.

17. The keeper of claim 11 having four legs extending from the base.

18. The keeper of claim 11 further comprising a disc member attached to one or more of the top members.

19. The linear actuator of claim 11 further comprising a pole piece.

20. The linear actuator of claim 11 further comprising a magnetic sleeve.

21. The linear actuator of claim 11 further comprising a mounting bracket.

22. The linear actuator of claim 21 wherein the material of construction of the mounting bracket is ferromagnetic.

23. The keeper of claim 1 in combination with a Coriolis mass flowmeter, wherein the Coriolis mass flowmeter comprises:

a conduit for receiving said material flow; and a linear actuator coupled to the flow conduit wherein the linear actuator comprises:

a magnet assembly having a magnet, and a coil assembly having a coil which slidably interacts with the magnet assembly.

24. The keeper of claim 23, wherein the bottom, side and top members of each leg define a continuous curved strip.

25. The keeper of claim 23, wherein:

the bottom members are substantially perpendicular to the longitudinal axis of the base;

the side members are substantially parallel to the longitudinal axis of the base; and the top members are substantially perpendicular to the longitudinal axis of the base.

26. The keeper of claim 23, wherein the top members each have an arcuate terminus.

27. The keeper of claim 23, wherein the combined terminus of each top member encircles at least fifty but less than one hundred percent of the magnet perimeter.

28. The keeper of claim 23, wherein the material of construction of the keeper is ferromagnetic.

29. The keeper of claim 23 having four legs extending from the base.

30. The keeper of claim 23 further comprising a disc member attached to one or more of the top members.

31. The linear actuator of claim 23 further comprising a pole piece.

32. The linear actuator of claim 23 further comprising a magnetic sleeve.

33. The linear actuator of claim 23 further comprising a mounting bracket.

34. The linear actuator of claim 23 wherein the material of construction of the mounting bracket is ferromagnetic.

* * * * *

UNITED STATES PATENT AND TRADEMARK OFFICE
CERTIFICATE OF CORRECTION

PATENT NO.    : 6,805,012 B2
DATED         : October 19, 2004
INVENTOR(S)   : Roger Scott Loving and Anthony William Pankratz It is certified that error appears in the above-identified patent and that said Letters Patent is hereby corrected as shown below:

<u>Column 8,</u>
Line 33, change "23" to -- 33. --

Signed and Sealed this

Eighth Day of February, 2005

JON W. DUDAS
*Director of the United States Patent and Trademark Office*